US006694102B2

(12) United States Patent
Baumann et al.

(10) Patent No.: US 6,694,102 B2
(45) Date of Patent: Feb. 17, 2004

(54) OPTICAL CONFIGURATION, IN PARTICULAR FOR BIDIRECTIONAL WDM SYSTEMS, AND A TRANSCEIVING MODULE FOR BIDIRECTIONAL OPTICAL DATA TRANSMISSION

(75) Inventors: Ingo Baumann, Zorneding (DE); Zhan Gao, Mühchen (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/023,403

(22) Filed: Dec. 17, 2001

(65) Prior Publication Data

US 2003/0053171 A1 Mar. 20, 2003

Related U.S. Application Data

(63) Continuation of application No. PCT/DE01/03602, filed on Sep. 14, 2001.

(51) Int. Cl.[7] .............................................. H04B 10/00
(52) U.S. Cl. ...................... 398/138; 398/135; 398/200
(58) Field of Search .............................. 359/124, 138, 359/127; 385/14, 15, 27, 28, 30, 31, 32, 39, 45, 50

(56) References Cited

U.S. PATENT DOCUMENTS

| | | | |
|---|---|---|---|
| 5,363,456 A | | 11/1994 | Bousselet |
| 5,396,328 A | * | 3/1995 | Jestel et al. .................. 356/482 |
| 5,802,224 A | * | 9/1998 | Okuta et al. ................... 385/43 |
| 5,825,951 A | * | 10/1998 | Kitamura ...................... 385/42 |
| 5,978,129 A | | 11/1999 | Jourdan et al. |
| 6,229,633 B1 | * | 5/2001 | Roberts et al. .............. 359/135 |
| 6,437,905 B1 | * | 8/2002 | Joyner et al. ................ 359/332 |
| 6,522,462 B2 | * | 2/2003 | Chu et al. .................... 359/344 |

FOREIGN PATENT DOCUMENTS

| | | |
|---|---|---|
| EP | 0 607 029 A2 | 7/1994 |
| JP | 03 186 808 | 8/1991 |
| JP | 0 6018 735 | 1/1994 |
| JP | 08 334 639 | 12/1996 |
| JP | 09 090 440 | 4/1997 |
| JP | 09 243 842 | 9/1997 |

* cited by examiner

Primary Examiner—Jason Chan
Assistant Examiner—Agustin Bello
(74) Attorney, Agent, or Firm—Laurence A. Greenberg; Werner H. Stemer; Ralph E. Locher

(57) ABSTRACT

An optical configuration includes a Mach-Zehnder interferometer and a directional coupler. Both the Mach-Zehnder interferometer and the directional coupler have a first arm and a second arm. The Mach-Zehnder interferometer and the directional coupler share a common arm.

A transceiving module for bidirectional optical data transmission, in particular for WDM systems with at least three wavelengths, includes two separate detection devices, an input/output optical waveguide, and an optical configuration as described above. The input/output optical waveguide receives and emits signals. The Mach-Zehnder interferometer separates signals of two wavelengths and feeds them to the separate detection devices. The directional coupler receives signals of the third wavelength from the optical transmitter and feeds the signals to the input/output optical waveguide by launching the signals of the third wavelength into the arm of the directional coupler common between the Mach-Zehnder interferometer and the directional coupler.

15 Claims, 2 Drawing Sheets

OPTICAL CONFIGURATION, IN PARTICULAR FOR BIDIRECTIONAL WDM SYSTEMS, AND A TRANSCEIVING MODULE FOR BIDIRECTIONAL OPTICAL DATA TRANSMISSION

CROSS-REFERENCE TO RELATED APPLICATION

This application is a continuation of copending International Application No. PCT/DE01/03602, filed Sep. 14, 2001, which designated the United States.

BACKGROUND OF THE INVENTION

1. Field of the Invention

The invention relates to an optical configuration, in particular for bidirectional WDM systems with at least three wavelengths. Such optical configurations typically have at least one Mach-Zehnder interferometer with a first arm, a second arm, and at least one directional coupler with a first arm and a second arm. The invention also relates to a transceiving module for bidirectional optical data transmission having such an optical configuration.

In optical telecommunications engineering, multiplexing data that is to be transmitted via an optical conductor maximizes the transmittable data volume. One possibility in this context involves transmitting information independently and simultaneously via one waveguide using a plurality of wavelengths. In particular, what are termed WDM (Wavelength Division Multiplex) systems are known in which information is transmitted in one fiber in parallel on a plurality of data channels of different wavelength. It is necessary in this case for the signals of various light sources to be combined in one optical conductor at the transmitting end, and for the signals of various wavelengths from the incoming waveguide to be split into individual channels for separate detection at the receiving end. Bidirectional data transmission occurs when signals are transmitted in both directions on an optical fiber. This technique can be implemented by using bidirectional modules.

Bidirectional modules are known for two-wavelengths and three-wavelengths WDM applications. The modules for two-wavelengths WDM applications have either a Mach-Zehnder interferometer, a directional coupler or a dielectric filter for separating two received wavelengths. The modules for three-wavelengths WDM applications generally have a hybrid construction of glass fibers, micromirrors, and dielectric filters in order to separate the three wavelengths.

SUMMARY OF THE INVENTION

It is accordingly an object of the invention to provide an optical configuration, in particular for bidirectional WDM systems, and a transceiving module for bidirectional optical data transmission that overcomes the hereinafore-mentioned disadvantages of the heretofore-known devices of this general type and that make available an optical configuration and a transceiving module for bidirectional optical data transmission that are of a simple construction with a high degree of integration. The optical configuration and the transceiving module are intended, in particular, to permit bidirectional optical data transmission using two received and one emitted wavelength.

With the foregoing and other objects in view, there is provided, in accordance with the invention, an optical configuration includes a Mach-Zehnder interferometer and a directional coupler. The Mach-Zehnder interferometer has a first arm and a second arm. The directional coupler has a first arm and a second arm. The Mach-Zehnder interferometer and the directional coupler are interlocked with one another, with one of the arms of the Mach-Zehnder interferometer simultaneously being one of the arms of the directional coupler.

With the objects of the invention in view, there is also provided a transceiving module for bidirectional optical data transmission, in particular for WDM systems with at least three wavelengths, including two separate detection devices, an input/output optical waveguide, and an optical configuration as described above. A first of the detection devices is for detecting a first of the three wavelengths. A second of the detection devices is for detecting a second the three wavelengths. The transmitting device is for transmitting a signal having a third of the three wavelengths. The input/output optical waveguide is for receiving signals of the first and second wavelengths and emitting signals of the third wavelength. The input of the Mach-Zehnder interferometer is for receiving the signals of the two wavelengths that are to be detected separately from the input/output optical waveguide. The Mach-Zehnder interferometer separates the signals of the two wavelengths and feeds them to the separate detection devices. The directional coupler receives the signals of the third wavelength from the optical transmitter and feeds the signals to the input/output optical waveguide by launching the signals of the third wavelength into the arm of the directional coupler simultaneously being one of the arms of the Mach-Zehnder interferometer and the directional coupler.

In accordance with the objects of the invention, the invention therefore encompasses an optical configuration including a Mach-Zehnder interferometer and a directional coupler. The Mach-Zehnder interferometer and the directional coupler are interlocked with one another in such a way that one arm of the Mach-Zehnder interferometer is simultaneously one of the arms of the directional coupler and vice versa; the arm being shared can be called a "common arm". In this way, the space requirement for the optical configuration is minimized and the degree of integration is raised. The Mach-Zehnder interferometer and the directional coupler are preferably integrated on one chip in this case.

In accordance with a further object of the invention, an optical configuration could include a plurality of Mach-Zehnder interferometers and a plurality of directional couplers, one Mach-Zehnder interferometer and one directional coupler being interlocked with one another in each case in the way according to the invention. It is thereby possible, for example, for Mach-Zehnder interferometers and directional couplers interlocked according to the invention to be cascaded or combined in another way. The exact construction depends in this case on the optical circuit to be implemented.

One arm of the Mach-Zehnder interferometer preferably has a shorter length than the other arm. In this case, the arm of greater length of the Mach-Zehnder interferometer forms one arm of the directional coupler. In particular, the arm of the directional coupler that is simultaneously an arm of the Mach-Zehnder interferometer runs rectilinearly, and so the directional coupler can be designed simply.

In a development of the invention, a phase shift is mounted on one arm of the Mach-Zehnder interferometer. This permits precise setting of the phase difference between the signals running in the two arms of the Mach-Zehnder interferometer. The phase shift compensates for manufacturing tolerances.

The Mach-Zehnder interferometer is preferably constructed to separate a first and a second wavelength presented at the input of the Mach-Zehnder interferometer and relay the output of the interferometer in separate optical paths. The directional coupler is preferably constructed in such a way that signals of a third wavelength that are present on one arm of the directional coupler are launched completely into the other arm of the directional coupler, which is simultaneously an arm of the Mach-Zehnder interferometer, and run in the process in the opposite direction to the signals of the first and second wavelength in this arm.

In an advantageous embodiment, the Mach-Zehnder interferometer has a 3 dB coupler on the input side that splits the incoming signals equally between the two arms. On the output side, the two arms of the Mach-Zehnder interferometer merge into two separate optical paths to which detection units are connected.

The optical configuration is preferably of optically integrated design. In particular, the optical conductors and optical arms of the Mach-Zehnder interferometer and of the directional coupler are of optically integrated design. However, it is also possible in principle to make use of fiber optic structures.

The transceiving module according to the invention is characterized by an optical configuration. The transceiving module of the invention provides for the following:
a) the signals of at least two wavelengths that are to be detected separately are present at the input of the Mach-Zehnder interferometer,
b) signals of two wavelengths are separated by the Mach-Zehnder interferometer and fed to separate detection devices, and
c) signals of a third wavelength, to be coupled outside the module, of the optical transmitter are present at the directional coupler, and the signals are launched into the common arm with the Mach-Zehnder interferometer and are fed to the input/output waveguide.

In accordance with a further object of the invention, a module with a high degree of integration is provided that can separate at least three wavelengths (two incoming and one outgoing).

In a preferred embodiment, the directional coupler is assigned a further directional coupler of which one arm is connected to the directional coupler and of which the other arm is connected to the optical transmitter. In this case, the following are true:
a) radiation emitted by the optical transmitter is launched into the arm connected to the directional coupler of the further directional coupler, and
b) radiation present in the arm connected to the directional coupler and that is launched by the Mach-Zehnder interferometer is not launched into the arm connected to the optical transmitter of the further directional coupler.

This ensures that interfering radiation launched from the interferometer into the directional coupler is not led to the optical transmitter thereby disturbing it.

The transceiving module according to the invention for bidirectional optical data transmission has an optical configuration, there being present at the input of the Mach-Zehnder interferometer signals of at least two wavelengths to be detected separately. The Mach-Zehnder interferometer separates the two wavelengths and feeds them to separate detection devices. An optical transmitting device provides signals of a third wavelength; the signals of the third wavelength are to be coupled outside the module. An optical transmitting device of the module is disposed at the input of the directional coupler and launches the signals of the third wavelength into the common arm with the Mach-Zehnder interferometer. The signals of the third wavelength are thereby fed to an input/output waveguide.

Other features that are considered as characteristic for the invention are set forth in the appended claims.

Although the invention is illustrated and described herein as embodied in an optical configuration, in particular for bidirectional WDM systems, and a transceiving module for bidirectional optical data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
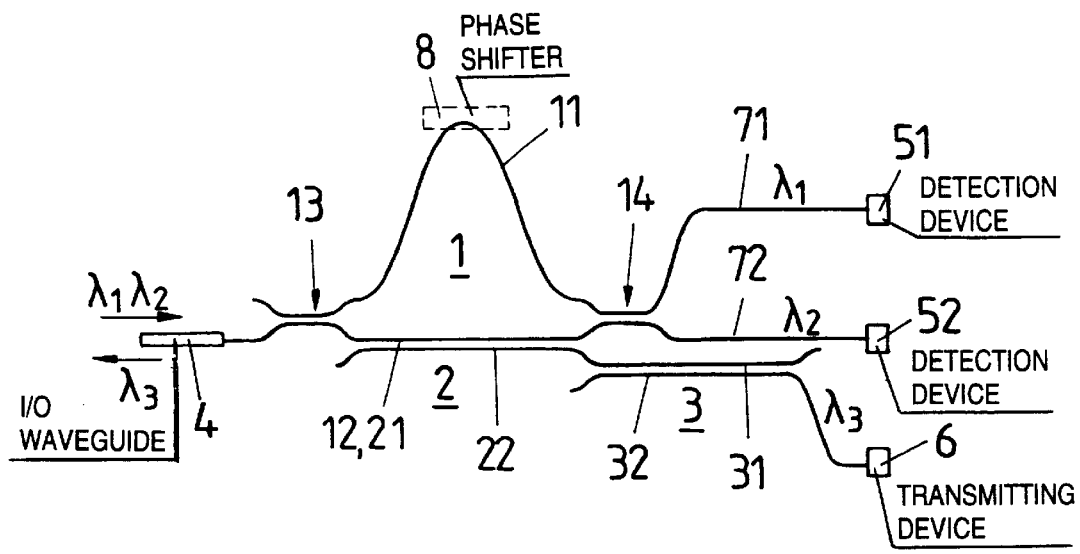
FIG. 1 is a partial schematic and partial diagrammatic view showing a first exemplary embodiment of a transceiving module having a Mach-Zehnder interferometer and two directional couplers.

Referring now to the figures of the drawings in detail and first, particularly to FIG. 1 thereof, there is shown a transceiving module for bidirectional optical data transmission, having an optical configuration that includes a Mach-Zehnder interferometer and two directional couplers 2, 3. The module 1 permits separates or combines signals of different wavelengths that are being transmitted in an optical conductor.

The transceiving module thus has an input/output waveguide 4, which is preferably a glass fiber, via which signals of a first wavelength $\lambda 1$ and a second wavelength $\lambda 2$ are transmitted in the input or receiving direction, and signals of a third wavelength $\lambda 3$ are transmitted in the output or transmitting direction. Signals of wavelengths $\lambda 1$, $\lambda 2$ are separated in a way explained further below by the Mach-Zehnder interferometer 1 and detected by two detection devices 51, 52 which are preferably photodiodes. Signals of wavelength $\lambda 3$ are transmitted by a transmitting device 6, (i.e., a laser diode) to the input/output waveguide 4 via the two directional couplers 3, 2.

In the exemplary embodiment illustrated, the wavelength $\lambda 1$ is at 1550 nm, the wavelength $\lambda 2$ at 1490 nm, and the wavelength $\lambda 3$ of the laser diode is 1310 nm. However, it is also possible in principle to use other wavelengths for the bidirectional data transmission.

The directional coupler 1 has an upper arm 11 and a lower arm 12 which have a difference in length of $\Delta L$. The upper arm 11 is in this case of greater length than the lower arm 12. The lower arm 12 of the Mach-Zehnder interferometer 1 simultaneously forms one arm 21 of the directional coupler 2, which includes two arms 21, 22 running in parallel, which are closely neighboring along a defined distance, such that energy can be exchanged between the two arms 21, 22.

A highly integrated, interlocking configuration of a Mach-Zehnder interferometer 1 and a directional coupler 2 is thereby provided in the case of which one arm 12 of the Mach-Zehnder interferometer simultaneously forms one of the arms 21 of a directional coupler.

The lower arm 22 of the directional coupler 2 is coupled to the transmitting device 6 via the further directional coupler 3. The directional coupler 3 has an upper arm 31 and a lower arm 32 which are, in turn, led in a closely neighboring fashion over a defined length.

Laser light of wavelength λ3 is launched by the laser diode into a neighboring waveguide that merges into the lower arm 32 of the further directional coupler 3. The laser light is then launched in the directional coupler 3 into the other arm 31, which is connected to the lower arm 22 of the directional coupler 2.

The Mach-Zehnder interferometer 1 operates as a wavelength separator. Present at its input 13 is a 3 dB coupler of which one arm is connected to the input/output waveguide 4. The 3 dB coupler 13 splits the input signal including the wavelength λ1, λ2 equally between the two arms 11, 12 of the Mach-Zehnder interferometer 1. In this case, in the lower arm 12 the signal leads the signal in the other arm 11 by the phase π/2.

A phase shifter 8 is optionally mounted on the upper arm 11 of the Mach-Zehnder interferometer 1. The shifter 8 permits the phase difference between the signals running in the two arms 11, 12 of the Mach-Zehnder interferometer to be set precisely. However, it is also possible to dispense with the phase shifter as indicated by the box being marked in phantom.

The two arms are guided in a closely neighboring fashion relative to one another at the output 14 of the Mach-Zehnder interferometer 1 such that energy can be exchanged between the two arms. The two arms 11, 12 merge in this case into separate optical paths 71, 72, of which the signals are detected by the detection units 51 and 52, respectively.

In this case, the two wavelengths λ1, λ2 are separated at the output 14 of the Mach-Zehnder interferometer 1 to the effect that one wavelength λ1 is launched completely into the top path 71, and the other wavelength λ2 is launched completely into the lower optical path 72. This is associated with the fact that the phase-shifted signals of the two arms 11, 12 can interact with one another at the output node 14 in such a way that the wavelength leading in phase and the wavelength lagging in phase are respectively launched into the other path. The Mach-Zehnder interferometer is designed in this case in such a way that the difference in length ΔL is 2π for the upper wavelength, that is to say for the wavelength of 1550 nm considered in the exemplary embodiment. The signal component, running in the lower arm 12, of wavelength λ1 leads in phase the signal component of wavelength λ1 in the upper arm 11, and is launched completely at the output node 14 into the upper arm or the upper optical path 71. In a corresponding way, the signal of wavelength λ2 (1490 nm in the present exemplary embodiment) is launched at the output 14 from the upper arm 11 into the lower arm 12 or the upper optical path 72.

At the same time as a separation of two wavelengths λ1, λ2 by the Mach-Zehnder interferometer 1, light of wavelength λ3 is launched into the input/output waveguide 4. As already explained, the light of wavelength λ3 is fed via the further directional coupler 3 to the lower arm 22 of the directional coupler 2. In the directional coupler 2, the signal of wavelength λ3 is launched completely into the upper arm 21 of the directional coupler 2, which is simultaneously the lower arm of a Mach-Zehnder interferometer 1. The signal of wavelength λ3 is then fed to the input/output waveguide 4 via the 3 dB coupler 13.

The second directional coupler 2 fulfils the task of leading light, launched into the directional coupler 2, of wavelengths λ1 and λ2 into a dead arm 31 of the further directional coupler, and in this way keeping it away from the transmitting device 6. Thus, because of the common arm with the Mach-Zehnder interferometer, a small proportion of the light of wavelengths λ1, λ2 is launched into the directional coupler 2 without this being desirable. This light is kept away from the transmitting device 6 by the further directional coupler 3, in order to protect the laser diode.

The described configuration can also be implemented in principle without a second directional coupler 3. A second directional coupler 3 is not needed when the transmitting device 6 is of robust design, or, when the small proportion of light in wavelengths λ1, λ2 received by the transmitting device 6 is not disturbed during operation.

The exemplary embodiment of FIG. 1 thus describes a transceiving module with the aid of which three wavelengths λ1, λ2, λ3 can be separated from one another. The wavelengths λ1, λ2, which are launched into the module by an input/output optical conductor, are in this case received separately and by two separate detection devices 51, 52. A signal of wavelength λ3 is launched via the transmitting device 6 into the input/output waveguide λ4.

Figure 2:
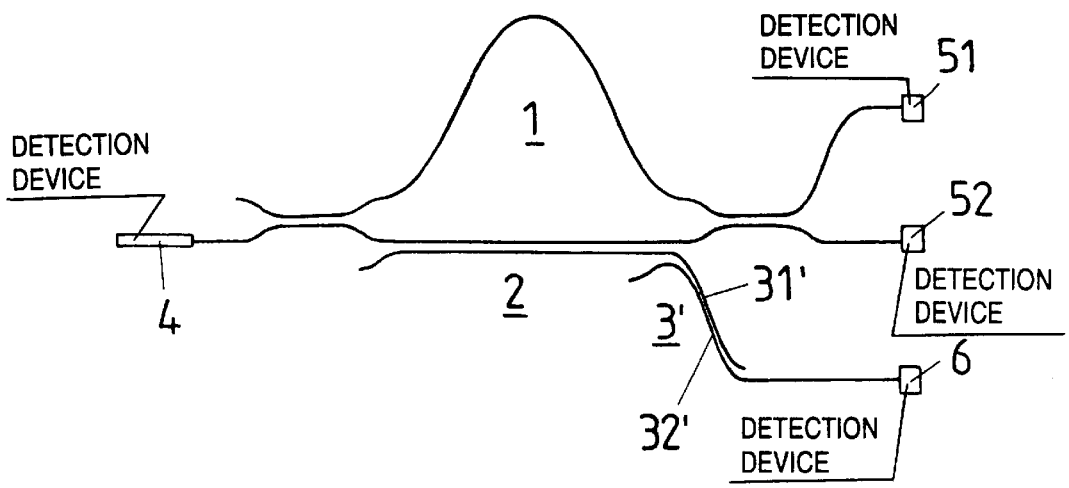
FIG. 2 is a partial schematic and partial diagrammatic view showing a second exemplary embodiment of a transceiving module having a Mach-Zehnder interferometer and two directional couplers.

The exemplary embodiment of FIG. 2 differs from the exemplary embodiment of FIG. 1 to an extent that the two arms 31', 32' of the second directional coupler 3' do not run rectilinearly in parallel as in FIG. 1, but run in a curved fashion in parallel instead. The overall size of the structure or the module can thereby be reduced further.

Figure 3:
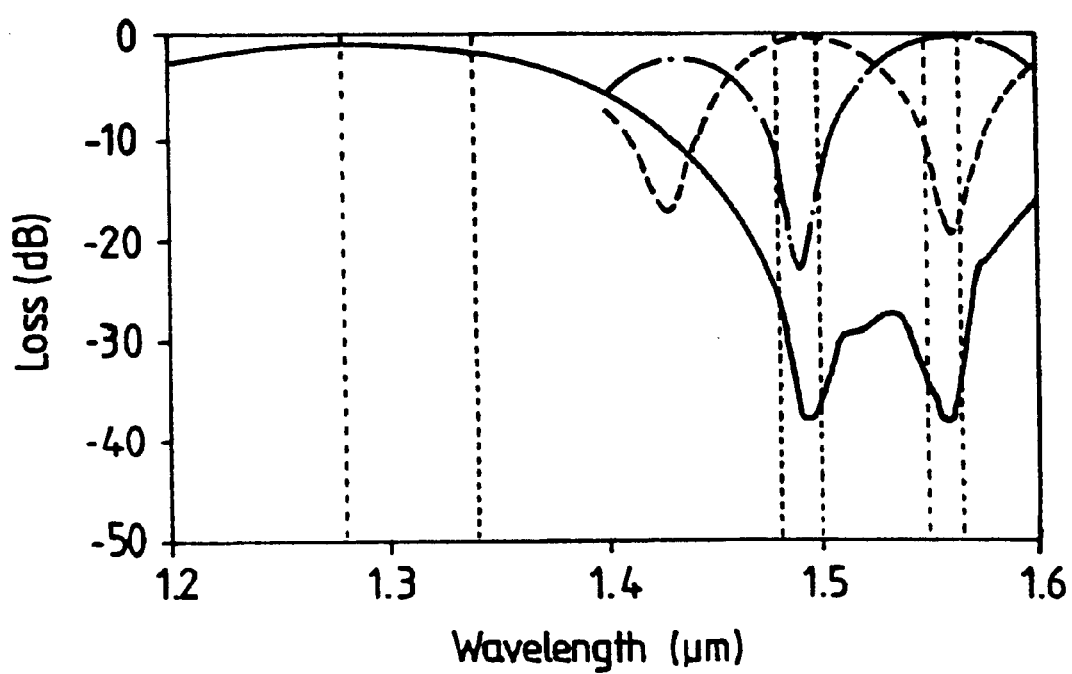
FIG. 3 is a graph plotting the filter characteristic of the transceiving module of FIGS. 1 and 2.

FIG. 3 shows the filter characteristic of the transceiving module of FIGS. 1 and 2, the wavelength λ being plotted on the abscissa, and the loss being plotted on the ordinate in the way it is present at the two photodiodes 51, 52 or the input/output waveguide 4 (for the wavelength λ3). The dashed and dotted line specifies in this case the loss at the one photodetector 51, the dashed line specifies the power at the other photodetector 52, and the continuous line specifies the loss at the input/output waveguide 4.

It is to be seen that virtually no loss is present at the receiver 51 for the wavelength λ1 (1550 nm). The same is valid for the wavelength λ2 (1490 nm) in the case of the photodiode 52 and for the wavelength λ3 (1310 nm) in the case of the input/output waveguide 4. The optical isolation between 1310 nm and 1490 nm, and between 1310 nm and 1550 nm is greater in this case than 30 dB, and the isolation between 1490 nm and 1550 nm is at approximately 20 dB. It follows that there is a very high-quality separation of the individual wavelengths.

The design of the invention is not limited to the exemplary embodiments illustrated above. All that is essential for the invention is that in an optical configuration having a Mach-Zehnder interferometer and a directional coupler the two should be interlocked with one another in such a way that one arm of the Mach-Zehnder interferometer simultaneously constitutes one of the arms of the directional coupler and vice versa.

We claim:
1. An optical configuration, comprising:
   a Mach-Zehnder interferometer with a first arm and a second arm, having an input and an output, and carry- ing signals having a first and a second wavelength in a first direction from said input to said output; and a directional coupler with a first arm and a second arm and carrying signals having a third wavelength in & second direction opposite said first direction to said input of said Mach-Zehnder interferometer;

said Mach-Zehnder interferometer and said directional coupler being interlocked with one another, with one of said arms of said Mach-Zehnder interferometer simultaneously being one of said arms of said directional coupler.

2. The optical configuration according to claim 1, wherein one arm of said Mach-Zehnder interferometer has a shorter length than the other arm, said arm with the shorter length is simultaneously said arm simultaneously being one of said arms of said directional coupler.

3. The optical configuration according to claim 1, wherein said arm of said directional coupler simultaneously being said arm of the Mach-Zehnder interferometer runs rectilinearly.

4. The optical configuration according to claim 1, including a phase shift mounted on one of said arms of said Mach-Zehnder interferometer.

5. The optical configuration according to claim 1, wherein said Mach-Zehnder interferometer separates signals of a first and a second wavelength present at said input and relays the signals to said output over separate optical paths.

6. The optical configuration according to claim 5, wherein said arm of said directional coupler not simultaneously being said arm of said Mach-Zehnder interferometer completely launches signals of a third wavelength launched into said other arm of said directional coupler in an opposite direction to the signals of the first and second wavelength.

7. The optical configuration according to claim 1 wherein: said Mach-Zehnder interferometer has an input side and an output side;

a 3 dB coupler disposed on said input side; and said two arms of said Mach-Zehnder interferometer merge into two separate optical paths on said output side.

8. The optical configuration according to claim 1, including a further directional coupler coupled to said directional coupler, said further directional coupler having two arms, one of said arms being connected to said arm of said directional coupler not simultaneously being an arm of said Mach-Zehnder interferometer, and the other of said arms being for connecting to a transmitting device.

9. The optical configuration according to claim 8, wherein said two arms of said further directional coupler run parallel and are curved.

10. The optical configuration according to claim 1, wherein said optical conductors and said optical arms of said Mach-Zehnder interferometer and of said directional coupler are optically integrated.

11. The optical configuration according to claim 1, that is configured for WDM systems with at least three wavelengths.

12. A transceiving module for bidirectional optical data transmission, comprising:

two separate detection devices, a first of said detection devices being for detecting a first of three wavelengths, a second of said detection devices being for detecting a second of the three wavelengths;

a transmitting device for transmitting a signal having a third of the three wavelengths; and an input/output optical waveguide for receiving signals of the first and second wavelengths and emitting signals of the third wavelength;

an optical configuration including a Mach-Zehnder interferometer with a first arm, a second arm, and an input, and a directional coupler with a first arm and a second arm, said Mach-Zehnder interferometer and said directional coupler being interlocked with one another, with one of said arms of said Mach-Zehnder interferometer simultaneously being one of said arms of said directional coupler;

said input of said Mach-Zehnder interferometer being for receiving the signals of the two wavelengths that are to be detected separately from said input/output optical waveguide;

said Mach-Zehnder interferometer separating the signals of the two wavelengths and feeding the signals to said separate detection devices, and said directional coupler receiving the signals of the third wavelength from said transmitting device and feeding the signals of the third wavelength to said input/output optical waveguide by launching the signals of the third wavelength into said arm of said directional coupler simultaneously being one of said arms of said Mach-Zehnder interferometer and said directional coupler.

13. The transceiving module according to claim 12, including a further directional coupler assigned to said directional coupler having two arms, one said arms being connected to said directional coupler and the other of said arms being connected to said transmitting device;

said transmitting device emitting radiation into said arm of said further directional coupler being simultaneously connected to said directional coupler; and said arm of said further directional coupler connected to said optical transmitter not receiving radiation launched into said arm connected to said directional coupler by said Mach-Zehnder interferometer.

14. The transceiving module according to claim 12, wherein:

the first received wavelength is 1550 nm;

the second received wavelength is 1490 nm; and a third emitted wavelength is 1310 nm.

15. The transceiving module according to claim 12, wherein said optical configuration is configured for WDM systems with at least three wavelengths.

* * * * *